United States Patent

[15] 3,644,897

McCrea et al.

[45] Feb. 22, 1972

[54] AUTOMATIC CONTROL POINT ADJUSTMENT SYSTEM AND METHOD

[72] Inventors: Alan F. McCrea; Hugh V. Snively, both of Richmond, Va.

[73] Assignee: Robertshaw Controls Company, Richmond, Va.

[22] Filed: Jan. 15, 1970

[21] Appl. No.: 3,005

[52] U.S. Cl. ........................................... 340/172.5, 235/151
[51] Int. Cl. ..................................................... G06f 15/46
[58] Field of Search .................... 340/172.5; 235/151, 151.1, 235/151.12, 151.2, 151.21

[56] References Cited

UNITED STATES PATENTS

| 3,011,709 | 12/1961 | Jacoby | 235/151 |
| 3,034,718 | 5/1962 | Freitas et al. | 235/151 |
| 3,039,687 | 6/1962 | Chope | 235/151 |
| 3,400,374 | 9/1968 | Schumann | 340/172.5 |

*Primary Examiner*—Paul J. Henon
*Assistant Examiner*—Melvin B. Chapnick
*Attorney*—Auzville Jackson, Jr., Robert L. Marben and Anthony A. O'Brien

[57] ABSTRACT

A system and method for automatically adjusting a control point including input circuits receiving arbitrarily selected control point values in engineering units and addresses of controllers to be adjusted, a memory storing conversion data for the controllers corresponding to a reset range and a curve of positioning of the controllers versus control point values, a calculator receiving the conversion data and the selected control point value for a controller and calculating a required position for the controller to provide the selected control point value, and a comparator receiving the required position and the actual position of the controller and providing output signals to move the controller to the required position.

8 Claims, 2 Drawing Figures

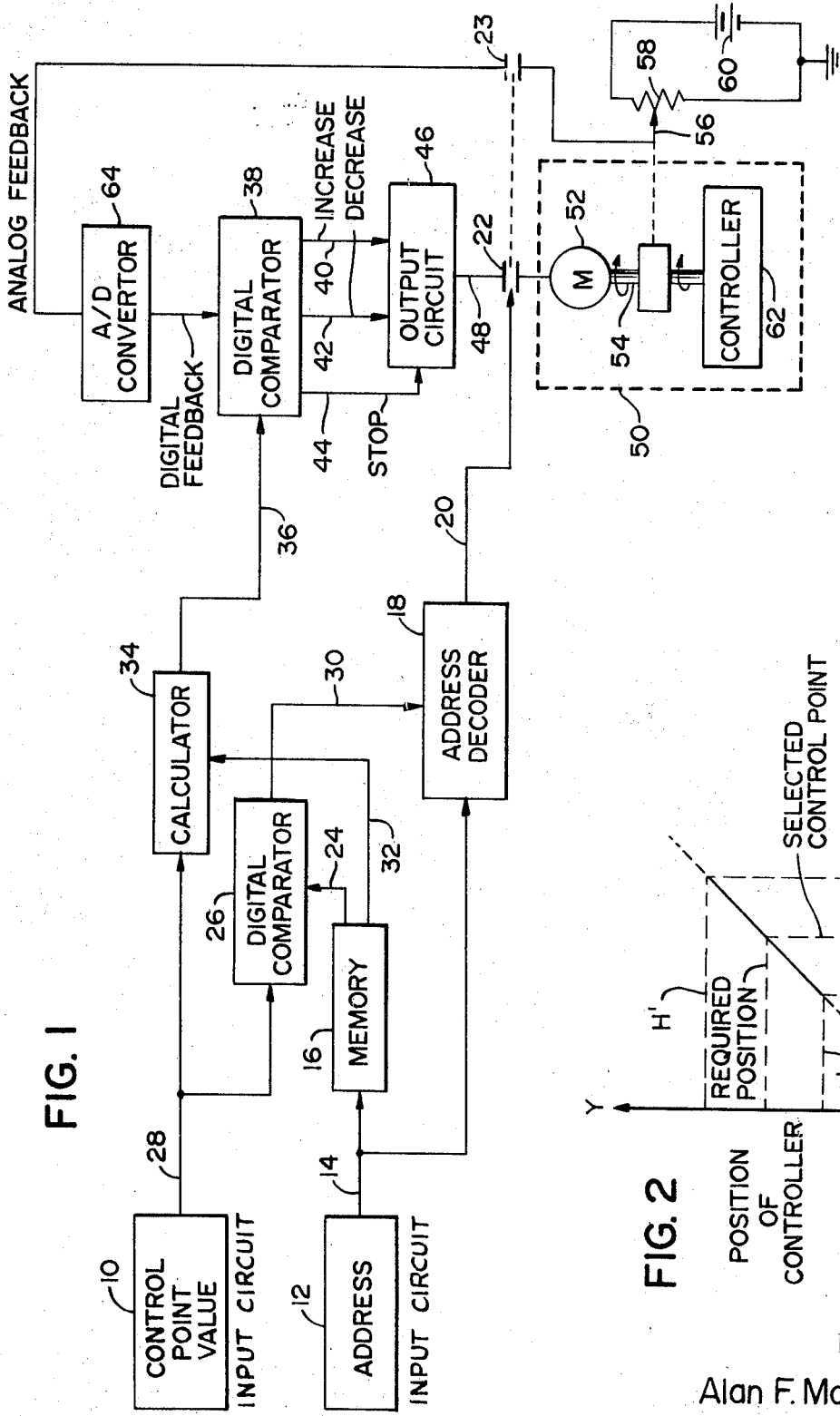

3,644,897

AUTOMATIC CONTROL POINT ADJUSTMENT SYSTEM AND METHOD

BACKGROUND OF THE INVENTION

1. Field of the Invention

The present invention pertains to automatic control point adjustment systems and methods and more particularly to such systems and methods utilizing engineering unit inputs.

Description of the Prior Art

In order to facilitate the supervision of complex systems such as those for environmental and process controls, it is desirable to permit control of the equipment therefor from a single central location such that complete supervision is available with a minimum number of operators. It is conventional to utilize computers at the central location to aid or completely operate the equipment of the systems; however, such computerized systems in the past have not fully realized their potential in easing the tasks and responsibilities of an operator at the central location.

One problem area that has existed in spite of computerization of centralized controls is that of arbitrarily adjusting control points for various equipment in the system. For instance, in an environmental control system for a building or group of buildings it may be required that temperature control points for various areas, zones, and buildings be varied frequently, and such a task at present requires the operator to determine the change in control point required as a function of the percentage of the reset range and then to move a controller in the correct direction to change the control point while visually detecting such movement such that when the desired control point is obtained, movement is stopped. Thus, an operator is required to perform calculations with respect to the reset range and conversion from normal engineering units to percentage of movement within the reset range for proper control point adjustment; and, accordingly, the undesirable human element of error is introduced into the control point adjustment. Such methods of control point adjustment have the disadvantages of being time consuming, inaccurate, complex and requiring unnecessary calculations.

SUMMARY OF THE INVENTION

Accordingly, it is an object of the present invention to provide an automatic control point adjustment system permitting an operator to introduce an arbitrarily selected control point into the system in engineering units.

Another object of the present invention is to provide a method of automatically adjusting a control point permitting the arbitrary selection of a control point value in engineering units.

A further object of the present invention is to permit an operator to adjust a plurality of control points having different engineering units associated therewith by merely introducing a desired control point value into a system in the engineering units associated with the control point to be adjusted.

The present invention is summarized in an automatic control point adjustment system including a controller movable to adjust a control point value, a first input circuit receiving an arbitrarily selected control point value in engineering units to be established by the controller, a second input circuit receiving the address of the controller, a memory storing conversion data corresponding to the curve of positioning of the controller versus control point values, the memory receiving an output from the second circuit corresponding to the address of the controller and providing an output representative of conversion data for the address controller, a calculator receiving the conversion data for the address controller, a calculator receiving the conversion data and the selected control point value and providing an output representative of the required position of the controller to provide the selected control point value, and a comparator receiving feedback signals representative of the actual position of the controller and the output from the calculator and providing outputs to the controller to control the position thereof.

Further objects and advantages of the present invention will become apparent from the description of the preferred embodiment as shown in the accompanying drawing.

BRIEF DESCRIPTION OF THE DRAWINGS

FIG. 1 is a block diagram of an automatic control point adjustment system according to the present invention.

FIG. 2 is a curve of controller position versus control point value for use in describing the operation of the system of FIG. 1.

DESCRIPTION OF THE PREFERRED EMBODIMENT

The control point adjustment system of the present invention is illustrated in FIG. 1 and includes an input circuit 10 for receiving inputs in engineering units corresponding to arbitrarily selected control point values. Input circuit 10 includes actuators, such as pushbuttons, toggle switches, thumbwheels, dials or the like, corresponding to the various engineering units utilized in a supervisory control system such that the operator can directly introduce a desired control point value into the system without converting to a standard such as percentage. The address of control apparatus to be adjusted is set into an input circuit 12 in any conventional manner, such as by using the actuators mentioned above.

A digital output 14 from address circuit 12 is received by a memory 16 which contains data corresponding to reset range and a curve of positioning of a controller versus control point value for each adjustable control apparatus in the system. The output 14 from address circuit 12 is also supplied to an address decoder 18 which provides an output 20 that controls two pair of normally open contacts 22 and 23 corresponding to the control apparatus addressed by the operator at input circuit 12. In practice, the pairs of contacts 22 and 23 will be provided for each control apparatus and the contacts along with the control apparatus will be located at positions remote from the remainder of the system.

Memory 16 has an output 24 which supplies digital data corresponding to the reset range of an addressed controller to a digital comparator 26 which further receives digital data corresponding to the selected control point value from an output 28 of input circuit 10. An output 30 from digital comparator 26 supplies an inhibit input to address decoder 18 to open the contacts associated with the addressed control apparatus if the selected control point value is not within the reset range of the controller.

Digital conversion data corresponding to the curve of the position of the controller versus control point value and the reset range is supplied on an output 32 from memory 16 to a calculator 34 which also receives the digital data on output 28 from input circuit 10 corresponding to the selected control point. Calculator 34 mathematically calculates the required position of the controller to provide the selected control point and provides a digital output 36 corresponding thereto to a digital comparator 38.

Digital comparator 38 has three outputs 40, 42 and 44 providing increase, decrease and stop signals, respectively, to an output circuit 46, and an output 48 from output circuit 46 is provided to control apparatus 50 through contacts 22. Control apparatus 50 includes a DC motor 52 having a shaft 54 controlling the position of a slider 56 on a potentiometer 58 which has a DC source 60 coupled thereacross. Shaft 54 also operates a controller 62, the position of which determines a control point. The voltage on slider 56 is an analog indication of the actual position of controller 62, and the voltage on slider 56 is supplied to an analog-to-digital converter 64. The output of converter 64 provides a digital feedback signal to comparator 38 for comparison with the output 36 from calculator 34 corresponding to the required position of controller 62.

Digital comparators 26 and 38 are conventional circuits which need not be described in detail. Comparator 26 is operative to provide an inhibit signal on output 30 when the selected control point value represented on output 28 of input circuit 10 is not within the reset range of the control apparatus addressed at input circuit 12 as represented at output 24 of memory 16. Comparator 38 compares the output 36 from calculator 34 representative of the required position of the controller to provide the selected control point value and the digital feedback signal from analog-to-digital converter 58 representing the actual position of the controller. Comparator 38 provides output signals corresponding to movement of motor 52 in a first direction, a second direction opposite to the first direction and to stop movement of the motor on outputs 40, 42 and 44, respectively. Output circuit 46 is operative in response to comparator 38 to provide a positive potential on output 48 when a signal is received on output 40 from comparator 38, a negative potential on output 48 when a signal is received on output 42 from comparator 38 and no potential on output 48 when a signal is received on output 44 from comparator 38.

Address decoder 18 is conventional and will normally include a plurality of outputs 20 connected with each of the contacts 22 for each control apparatus 50. The output 14 from input circuit 12 is representative of the address of the control apparatus to be controlled, and this address is decoded at address decoder 18 to energize the proper output 20 to close contacts 22 associated with the addressed control apparatus. If an inhibit signal is received on output 30 from comparator 26, address decoder 18 will remove the signal from the proper output 20 to open all contacts 22.

Calculator 34 contains circuitry capable of plotting a point on a given curve when receiving conversion data defining the curve and a selected point on the abscissa of the curve. Such circuitry is conventional and well known and may be provided, for example, by a Westinghouse Prodac Computer. Thus calculator 34 provides an output 36 corresponding to the required position of the control apparatus to provide an arbitrarily selected control point.

Controller 62 may include a valve, damper or the like which is positioned in response to movement of motor 52 and remains in that position to control operation of any suitable equipment. For set point operation, controller 62 may include devices responsive to the external condition to be controlled. For instance, for space heating temperature control, a thermostat device will have its set point adjusted by motor 52; and, when the temperature is lower than the set point value, the thermostat device will provide an output to open a valve, damper or the like to supply heat to the space. Of course, set points may be adjusted for any condition; and, dependent on the means for sensing the existing condition value, pneumatic apparatus may be utilized to provide set point control. That is, a gradual switch or pressure regulator may be responsive to movement of shaft 54 to provide an outlet pressure corresponding to the required position of a pneumatic control device. The condition is sensed and supplied to the control device as a pressure such that by effectively comparing pressures an output may be obtained to control a valve, damper or the like.

The operation of the present invention will be described with reference to FIG. 2 which is an example of a curve of the positioning of controller 62 versus control point values in degrees Fahrenheit. Dashed lines L and H represent low and high control point adjustment limits and thus define the reset range as being between 65° F. and 75° F., and dashed lines L' and H' define controller adjustment limits compatible with the reset range. In order to adequately define the curve, conversion data stored in memory 16 includes the slope or gradient of the curve and the point at which the curve intersects the y-axis.

If the operator desires to change the control point, he introduces the desired control point value, for example 70° F., into input circuit 10 in degrees Fahrenheit and the address of the controller into input circuit 12 in accordance with any suitable addressing scheme, such as alphanumeric addressing. The address is supplied to decoder 18 to close contacts 22 and 23 associated with the addressed controller and to memory 16. Memory 16 supplies digital data defining the reset range between 65° F. and 75° F. to comparator 26 which also receives digital data from input circuit 10 corresponding to the 70° F. desired control point value. Since the 70° F. control point value is within the reset range, no inhibit signal will be received by decoder 18; however, if the desired control point value had been 60° F., comparator 26 would have provided an inhibit signal to decoder 18 since the desired control point value would not be within the reset range. Upon receiving an inhibit signal from comparator 26, decoder 18 operates to return contacts 22 to their normally open state to thereby prohibit any control operation at the controller.

Memory 16 supplies conversion data including the reset range in digital form to calculator 34 on output 32. The conversion data for the curve of FIG. 2 includes a slope or gradient of one and an offset or y intercept of two units of position which may, of course, be any suitable units. Thus, an output is derived by calculator 34 by solving the equation for the curve for the y or position component corresponding to the desired control point value of 70° F.

The required position of the controller is provided on output 36 to comparator 38, and comparator 38 compares the required position as received from calculator 34 with the actual position as received from slider 56 through contacts 23. The required position signal from calculator 34 is referenced to the signal from slider 56 such that they may be accurately compared. That is, if DC source 60 is 24 v. the digital output 36 is calculated as a percentage of the reset range between limits L' and H' and multiplied by 24 v. such that both inputs to comparator 38 are referenced to 24 v. Thus, output 36 will correspond to 12 v.

If the required position signal is greater than the actual position signal, a signal will be received on output 40 by output circuit 46, and output circuit 46 will supply a positive potential to motor 52 through contacts 22 to drive the motor in a direction such that slider 56 is moved toward the positive terminal of source 60. Once motor 52 is driven to the required position, comparator 38 will provide a stop signal on output 44 to remove the positive potential from output 48 of output circuit 46 to stop motor 52. Controller 62 is controlled by shaft 54; and, accordingly, when shaft 54 is properly positioned, controller 62 is positioned to provide the selected set point value. Of course, if the required position signal is less than the actual position signal, motor 52 will be driven in the opposite direction to properly position controller 62.

The description of an adjustment of a temperature control point is for illustrative purposes only and it should be appreciated that the control point adjustment system and method of the present invention may be utilized with various control points measured in many various engineering units. Some of the control points which may be adjusted in accordance with the present invention other than temperature include percentage open as used with valves or dampers, for instance; electrical power as measured in watts; energy as measured in B.t.u.s, pounds or tons; pressure as measured in pounds per square inch; flow as measured by g.p.m.; and speed as measured in distance per unit of time.

The system and method above described for automatically adjusting a control point is adapted to be performed by a digital computer, such as the Westinghouse Prodac computer; and, accordingly, input circuits 10 and 12 may include computer compatible typewriters to introduce control point values and addresses into the system. Other adjustable controllers in the system will be connected through a pair of contacts to output 48 of output circuit 46, and the actual position outputs from sliders 56 will be connected through another pair of contacts to converter 64. Thus, a plurality of control apparatuses 50 may be located at positions remote from the remainder of the system but selectively in communication therewith through contacts 22 and 23.

Inasmuch as the present invention is subject to many variations, modifications and changes in detail, it is intended that all matter contained in the foregoing description or shown in the accompanying drawing shall be interpreted as illustrative and not in a limiting sense.

What is claimed is:

1. An automatic control point adjustment system comprising control means movable to adjust a control point value and having a specific curve of positioning thereof versus control point values, said control means having a first output providing feedback signals corresponding to the actual position of said control means;

first input means for receiving data in engineering units corresponding to an arbitrarily selected control point value to be established at said control means and providing a second output representative of said selected control point value;

second input means for receiving data corresponding to an address of said control means and providing a third output representative of said address;

memory means storing conversion data corresponding to said curve of positioning of said control means versus control point values, said memory means receiving said third output from said second input means and providing a fourth output representative of said conversion data;

calculating means receiving said second output from said first input means representative of said selected control point value and said fourth output from said memory means representative of said conversion data, said calculating means providing a fifth output representative of a required position of said control means to provide said selected control point value; and comparator means receiving said feedback signals from said first output of said control means corresponding to the actual position of said control means and said fifth output from said calculating means representing said required position for said control means, said comparator means having a sixth output connected with said control means to move said control means until said feedback signals from said first output of said control means correspond to said fifth output from said calculating means whereby said control means is automatically moved to said required position to provide said selected control point value.

2. The invention as recited in claim 1 wherein said control means has a reset range, said conversion data stored by said memory means includes said reset range, and said fifth output from said calculating means represents said required position as a function of said reset range.

3. The invention as recited in claim 2 wherein said control means includes a potentiometer connected across a source of electrical potential and slider positionable on said potentiometer in accordance with the actual position of said control means to provide said feedback signals.

4. The invention as recited in claim 3 wherein said control means includes a normally open switch connected with said sixth output from said comparator means, and address decoding means receives said third output from said second input means representative of said address of said control means and has a seventh output controlling said switch to close said switch when said control means is addressed.

5. The invention as recited in claim 4 wherein said memory means has an eighth output representative of said reset range, and second comparator means receives said eighth output from said memory means and said second output from said first input means representative of said selected control point value, said second comparator means having a ninth output providing an inhibit signal to said address decoding means to open said switch when said selected control point value is not within said reset range.

6. The invention as recited in claim 5 wherein said control means includes an electric motor connected with said switch, and said sixth output from said first recited comparator means includes first means providing a positive potential to operate said motor in a first direction and second means providing a negative potential to operate said motor in a second direction opposite to said first direction.

7. A method of automatically adjusting a control point comprising the steps of storing conversion data in a memory for a plurality of control means, said data including a curve of the position of the control means versus control point values in engineering units for each of said control means;

addressing said memory to obtain said conversion data for a specific control means;

arbitrarily providing a control point value in engineering units for said specific control means;

supplying said arbitrarily provided control point value and said conversion data for said specific control means to a calculator;

calculating with said calculator a required position for said specific control means to provide said arbitrarily provided control point value and providing an output signal corresponding to said required position;

generating a feedback signal corresponding to the actual position of said specific control means; and comparing said output signal with said feedback signal and providing control signals corresponding to the difference therebetween to said control means to move said control means toward said required position.

8. The invention as recited in claim 7 wherein said step of storing conversion data includes storing a reset range for each of said control means, and said step of calculating said required position for said specific control means includes providing said output signal as a function of said reset range.

* * * * *